United States Patent [19]
Hensel et al.

[11] 3,867,438
[45] Feb. 18, 1975

[54] PROCESS FOR THE OXIDATION OF α,β-UNSATURATED ALDEHYDES TO α,β-UNSATURATED CARBOXYLIC ACIDS

[75] Inventors: Jorg Hensel; Theodor Lussling, both of Grossauheim; Ewald Noll, Grosskrotzenburg; Hans Schaefer, Grossauheim; Wolfgang Weigert, Offenbach, all of Germany

[73] Assignee: Deutsche Gold- und Silber - Scheideanstalt vormals Roessler, Frankfurt am Main, Germany

[22] Filed: July 27, 1973

[21] Appl. No.: 383,232

Related U.S. Application Data

[62] Division of Ser. No. 188,462, Oct. 12, 1971, Pat. No. 3,773,692.

[30] Foreign Application Priority Data
Oct. 13, 1970 Germany.............................. 2050155

[52] U.S. Cl............................................. 260/530 N
[51] Int. Cl........................ C07c 57/04, C07c 51/26
[58] Field of Search..................... 260/530 N, 533 N

[56] References Cited
UNITED STATES PATENTS
3,595,911  7/1971  Ball................................. 260/530 N
3,736,354  5/1973  Yanozita et al................. 260/530 N

*Primary Examiner*—Lorraine A. Weinberger
*Assistant Examiner*—Richard D. Kelly

[57] ABSTRACT

Catalyst for the oxidation of an α,β-unsaturated aldehyde to an α,β-unsaturated carboxylic acid, said catalyst comprising (A) a mixture of oxides of the elements antimony, molybdenum, vanadium and tungsten and/or compounds of said elements and oxygen, and (B) at least one oxide or oxygen containing compound of the elements lead, silver, copper, tin, titanium or bismuth, said catalyst having an atomic ratio of antimony to molybdenum to vanadium to tungsten to Group (B) elements of about 1 – 60 : 12 : 0.5 – 25 : 0.1 – 12 : 0.1 – 12. Processes for the use and preparation of the catalysts are provided.

16 Claims, No Drawings

PROCESS FOR THE OXIDATION OF α,β-UNSATURATED ALDEHYDES TO α,β-UNSATURATED CARBOXYLIC ACIDS

This is a division of application Ser. No. 188,462, filed Oct. 12, 1971, now U.S. Pat. No. 3,773,692.

This invention relates to catalysts for the oxidation of α,β-unsaturated aldehydes to corresponding α,β-unsaturated carboxylic acids, and especially the oxidation of acrolein to acrylic acid, and methacrolein to methacrylic acid. This invention also relates to methods of preparing and using such catalysts.

Numerous processes have been known for the oxidation of α,β-unsaturated aldehydes. The processes differ by way of reaction conditions, and especially by use of various catalysts. Oxides of elements which occur in several oxidation stages are often used. Thus, oxides of vanadium, molybdenum, etc. are especially suitable. The latter in most instances are used on a carrier substance consisting of silicon dioxide or aluminum oxide.

Among the known processes and catalysts there are only a few suitable for industrial use where high conversions and high yields of product, such as acrylic acid in short contact times are required. Thus, in English Pat. No. 903,034, among others, molybdenum-antimony, molybdenum-tungsten and molybdenum-vanadium oxide catalysts are described. These catalysts can be used to convert acrolein to acrylic acid, but with relatively small yields. According to Belgian Pat. No. 698,273, a contact catalyst which contains molybdenum, vanadium and tungsten oxide gives somewhat more favorable results. It has turned out, however, that the yields of acrylic acid obtainable thereby will not permit economical production because the throughputs of acrolein possible on such catalysts are limited. For economical oxidation on an industrial scale, a catalyst is needed which remains active for a relatively long period of time making possible throughputs which are profitable in large scale industrial processes.

Accordingly, this invention provides a catalyst for the oxidation of an α,β-unsaturated aldehyde to an α,β-unsaturated carboxylic acid, said catalyst comprising (A) a mixture of oxides of the elements and/or compounds elemental, antimony, molybdenum, vanadium and tungsten of said elements with oxygen, and (B) at least one oxide or oxygen containing compound of the elements lead, silver, copper, tin, titanium or bismuth, said catalyst having an atomic ratio of antimony to molybdenum to vanadium to tungsten to Group (B) elements of about 1 – 60 : 12 : 0.5 – 25 : 0.1 – 12 : 0.1 – 12. The atomic ratio is preferably about 3–40 : 12 : 1–12 : 0.1–6 : 0.1–6. A particularly preferred atomic ratio is about 3–15 : 12 : 1–8 : 0.5–3 : 0.5–3.

This invention also provides a process for preparing a catalyst comprising (A) thoroughly mixing at least one compound selected from the group consisting of oxides, nitrates and ammonium salts of oxy acids of the elements antimony, molybdenum, vanadium or tungsten with at least one compound selected from the group consisting of oxides and nitrates of lead, silver, copper, tin, titanium or bismuth, (B) heating the resulting mixture in a first stage for about 2–300 minutes at about 150°–275°C., followed by (C) heating the mixture in a second stage in the presence of an oxygen containing gas for about 2–300 minutes at about 400°–480°C.

Further, this process provides a method for preparing the novel catalyst of this invention comprising (A) thoroughly mixing aqueous solutions or suspensions of at least one compound selected from the group consisting of oxides, nitrates and ammonium salts of oxy acids of the elements antimony, molybdenum, vanadium or tungsten with at least one compound selected from the group consisting of oxides and nitrates of lead, silver, copper, tin, titanium or bismuth, (B) heating the resulting mixture at about 50°–100°C. while stirring and at a pH of about 2–7, (C) separating the resulting catalyst mass from the aqueous phase, (D) drying and heating the catalyst mass in a first stage for about 2–300 minutes at about 150°–275°C., followed by (E) heating the catalyst mass in a second stage in the presence of an oxygen containing gas for about 2–300 minutes at about 400°–480°C.

Also, there is provided a process of using the novel catalysts of this invention which comprises oxidizing in a vapor phase an α,β-unsaturated aldehyde to an α,β-unsaturated carboxylic acid.

The catalysts of this invention can be used as such. Preferably, the catalysts are applied to or mixed with a carrier substance. Suitable carrier substances are for example, aluminum oxide and silicon dioxide. Others will be apparent to the art skilled. Preferably, the catalysts contain a mixture of carriers consisting of one or more components with a small specific surface (0.5 – 30 $m^2/g$), and one or more components with a relatively large surface area (50–500 $m^2/g$). Particularly preferred as carrier materials are highly dispersed silicon dioxide or diatomite, mixtures of highly dispersed silicon dioxide and diatomite and/or montmorillonite.

The activity of the catalyst can be controlled by varying the weight ratio of the catalyst to the carrier, and especially by varying the ratio of carrier components with a large and small surface area.

The production of the catalysts can be accomplished by thoroughly mixing oxides and/or nitrates and/or ammonium salts of oxy acids of the elements antimony, molybdenum, vanadium and tungsten with one or more of the oxides and/or nitrates of the elements lead, silver, copper, tin, titanium and bismuth, optionally with a carrier material. The resulting mixture is then heated in a first step for about 2 – 300 minutes, preferably about 10 – 150 minutes. Heating is conducted at about 150° – 275°C., preferably about 200° – 250°C. Subsequently, the mixture is heated in a second stage for about 2 – 300 minutes, preferably about 2 – 60 minutes. About 5 – 30 minutes is particularly preferred. Heating in the second step is conducted at about 400° – 480°C., preferably about 420° – 460°C., in the presence of oxygen containing gases, preferably air.

Preferably, the production of the catalysts is accomplished by thoroughly mixing aqueous solutions or suspensions, for example pastes, of the oxides and/or nitrates and/or ammonium salts of oxy acids of the elements antimony, molybdenum, vanadium and tungsten with one or more of the oxides and/or nitrates of the elements lead, silver, copper, tin, titanium and bismuth, optionally with a carrier material. The resulting mixture is heated at a pH of about 2 – 7, preferably 3 – 5, while stirring to about 50° – 100°C. The catalyst mass is separated from the aqueous phase, and dried and heated in a first stage for about 2 – 300 minutes, preferably about 10 – 150 minutes, at about 150° – 275°C., preferably about 200° – 250°C. Subsequently, the mass is heated in a second stage for about 2 – 300 minutes at about 400° – 480°C., preferably 420° – 460°C., in the presence of an oxygen containing gas, preferably air.

It will be understood that within the scope of the method just described, compounds of the catalytically effective elements which decompose thermally in a similar manner can also be used. Furthermore, the addition of thermally decomposable ammonium salts to the aqueous solution or suspension can increase the effectiveness of the catalyst. Ammonium nitrate is preferred. Also, the antimony oxide when used can be pretreated with nitric acid.

According to a preferred embodiment of the invention, carrier materials consisting of one or more components with a low specific surface (0.5 – 30 m²/g) together with carrier materials consisting of one or more components with large specific surfaces (50 – 500 m²/g) can be used.

As carrier material, there can be used diatomite, highly dispersed silicon dioxide, or in a particularly preferred embodiment of the invention, mixtures of highly dispersed silicon dioxide and diatomite and/or montmorillonite. The montmorillonite can advantageously be heated to 900° – 1200°C prior to mixing with silicon dioxide. Furthermore, the montmorillonite can be pretreated with acid prior to heating. Hydrochloric acid, nitric acid, phosphoric acid and sulfuric acid are preferred.

The catalyst can optionally be used in the shape of pressed articles, which preferably are molded from a mass of raw catalyst heated in a first step in an oxygen containing gas at about 150° – 275°C, preferably about 200° – 250°C. Prior to pressing, the mass can be ground if necessary and conventional molding agents, for example graphite, can be added in a conventional molding or extruding apparatus.

According to a particularly preferred embodiment of this invention, it is possible to achieve a graduation of the activity of the catalysts by treating the prepared catalyst with a slightly reducing or inert gas stream. Preferably, a nitrogen atmosphere heated to about 350° – 600°C., preferably about 400° – 550°C., is used.

The methods described will permit production of a catalyst having the desired activity and selectivity. The catalyst is particularly suitable for industrial application. Conventional fixed bed reactors consisting of pipe assemblies can be charged in a suitable manner with a catalyst graduated in activity as described above. Thus, the conversion of reactants can be made to occur evenly over the entire length of the reaction. Local temperature peaks which lead to side reactions, for example burning of the product to form carbon monoxide, carbon dioxide and water, will be avoided. The graduation of the activity remains unchanged just as the activity and selectivity of the catalyst remain constant for a long time. The catalysts of this invention also can be used in fluidized bed reactors. The favorable characteristics of the catalysts of this invention originate, to a considerable extent, in a structure formed by the two stage heat treatment of the unburnt, dried mass of raw catalyst in the presence of oxygen containing gases, especially air.

The invention, is also useful for the oxidation of $\alpha,\beta$-unsaturated aldehydes to $\alpha,\beta$-unsaturated carboxylic acids in a vapor phase. Use of the catalysts for the oxidation of acrolein or methacrolein to acrylic acid or methacrylic acid in the vapor phase is preferred.

The catalysts of this invention differ from the catalysts used in known processes in that they not only make possible very high conversions, but, surprisingly, they do not show any change in their activity and selectivity even after several months of operating time. The catalysts of this invention have excellent selectivity for the oxidation of $\alpha,\beta$-unsaturated aldehydes to $\alpha,\beta$-unsaturated carboxylic acids. For example, acrolein can be converted to acrylic acid with yields of more than 90%. Finally, the catalysts of this invention make possible very high throughputs in industrial operations.

The oxidation of $\alpha,\beta$-unsaturated aldehydes to $\alpha,\beta$-unsaturated carboxylic acids with the use of catalysts according to this invention takes place in the customary manner by way of oxygen in the presence of water in the vapor phase. For the selection of the conversion conditions, there is a very broad latitude. The conversion is carried out mostly with out use of pressure or with a slight excess pressure up to about 3 atm., and at temperatures of about 200° – 350°C. The oxygen for the oxidation may originate from any given sources. Generally air is used. The quantity ratios among $\alpha,\beta$-unsaturated aldehydes, air and water may vary within broad limits. Typical of the molar ratios between $\alpha,\beta$-unsaturated aldehyde and air are 1 : 2.5 – 1 : 30, preferably 1 : 2.5 – 1 : 10. Typical of the molar ratios between $\alpha,\beta$-unsaturated aldehyde and water are 1 : 2 – 1 : 20, preferably 1 : 2 – 1 : 10. Preferably, feeds of 0.5 – 10, preferably 1.5 – 8 moles $\alpha,\beta$-unsaturated aldehyde/1.hr are used.

This invention will be more clearly understood by reference to the following examples in which all parts, proportions and percentages are by weight unless otherwise indicated. Following are definitions of terms used herein.

$$\text{Feed of } \alpha,\beta\text{-unsaturated aldehyde} = \frac{\alpha,\beta\text{-unsaturated aldehyde fed}}{\text{bulk volume of catalyst} \cdot \text{time}} \quad \left[\frac{\text{Mole}}{\text{l} \cdot \text{h}}\right]$$

$$\text{Conversion Turnover} = \frac{\text{mole converted } \alpha,\beta\text{-unsaturated aldehyde}}{\text{mole used } \alpha,\beta\text{-unsaturated aldehyde}} \cdot 100$$

$$\text{Yield} = \frac{\text{mole product produced}}{\text{mole } \alpha,\beta\text{-unsaturated aldehyde fed}} \cdot 100 \ (\%)$$

EXAMPLE 1

87.5 g antimony-(III)-oxide ($Sb_2O_3$) is pretreated by heating while stirring with 200 ml concentrated nitric acid until boiling. When no more nitrous gases escape, the product is sucked off and washed with water. 212 g ammonium heptamolybdate [$(NH_4)_6Mo_7O_{24} \cdot 4H_2O$] are dissolved in 3.5 liters water at below 50°C. The pretreated antimony oxide, 212 g diatomite (Merck, DAB 6 – BET surface 3.5 m²/g), 24.2 g copper nitrate [$Cu(NO_3)_2 \cdot 3 H_2O$] dissolved in 50 ml water, 35.1 g ammonium monovanadate ($NH_4VO_3$) dissolved in 1 liter hot water and 30.4 g ammonium dodecatungstate [$(NH_4)_{10}W_{12}O_{41}$] suspended in 50 ml hot water, are added to the heptamolybdate solution while stirring. The mixture is brought to pH 3 with nitric acid, and is heated at boiling for two hours while stirring. Subsequently, the mixture is largely freed of water on a roller drier, is heated in air for 20 minutes to 250°C., and is then cooled. After the addition of 3% by weight graphite powder, it is pressed into tablets of 5 mm diameter. The pressed articles subsequently are heated in a rotary kiln to 450° C. in air (dwell time in the rotary kiln about 8 minutes). The resulting catalyst contains antimony, molybdenum, vanadium, tungsten and copper in a molar ratio of 6 : 12 : 3 : 1.2 : 1 and diatomite as a carrier. The mechanical strength of the tablets expressed by the average breaking pressure in the case of radial pressure amounts to 1 kp.

65 ml of this catalyst are added to a solid bed reactor made of high grade steel with an inside diameter of 20 mm and 350 mm length. The reactor is heated by means of a salt bath to 272°C. A gas mixture of acrolein, air and water vapor in a molar ratio of 1 : 10 : 5 is passed across the catalyst at this temperature. The rate of addition of the acrolein is 2.65 mole/l.h. An acrolein conversion of 99% and an acrylic acid yield of 91% based on the initial quantity is achieved.

EXAMPLE 2

In accordance with the procedure of Example 1, a catalyst is produced which has the same composition, but a carrier mixture of diatomite (BET surface 3.5 m²/g) and highly dispersed silicon dioxide powder [Aerosil 200(BET surface 170 m²/g)] is used. The starting substances are 875 g antimony oxide, 2120 g ammonium heptamolybdate, 351 g ammonium monovanadate, 304 g ammonium paratungstate, 242 g copper nitrate, 1093 g highly dispersed silicon dioxide powder and 1093 g diatomite. The mechanical strength of the tablets expressed by the average breaking pressure in the case of radial pressure is 4 kp.

Use of this catalyst in the reactor of Example 1 at a salt bath temperature of 246°C. results in an acrolein conversion of 98.7% and an acrylic acid yield of 86.0% based on the initial products. The special advantage of the catalyst lies in the fact that it permits use of a quite low operating temperature of 246°C. with very good conversion and yield values.

EXAMPLE 3

According to the procedure of Example 2, a catalyst is produced with the difference that the pH value of the aqueous solution is not 3 but 1.

The highest yield on the initial quantity of products of acrylic acid of this contact mass amounts in this case only to 59% at a salt bath temperature of 261°C. and an acrolein turnover of 77.5%. Thus, the preferred embodiment of this invention, which involves mixing the starting substances in an aqueous environment at pH values between 2 and 7, has a favorable effect on the conversion and yield.

EXAMPLE 4

According to the procedure of Example 2, a catalyst is produced, with the difference that the diatomite is replaced by an equal quantity of montmorillonite (BET surface 5.4 m²/g) which previously had been heated for 5 hours to 1000°C. The mechanical strength of the catalyst tablets expressed by the average breaking pressure at radial pressure is 8 kp. As compared to the catalyst tablets obtained according to Example 1, this is an eight-fold increase in strength.

At a salt bath temperature of 268°C., 93% of the acrolein used is converted and acrylic acid is formed at a yield of 82%.

EXAMPLES 5 – 10

The catalysts of Examples 5 – 10 are prepared just as in Example 1. Besides the same quantity in each case of antimony trioxide (87.5 g), ammonium heptamolybdate (212 g), ammonium monovanadate (35.1 g) and ammonium paratungstate (30.4 g), the following are used:

| Example Number | Addition | Diatomite | Aerosil 200 |
|---|---|---|---|
| 5 | 8 g $TiO_2$ | 110.0 g | 110.0 g |
| 6 | 33.1 g $Pb(NO_3)_2$ | 92.0 g | 138.0 g |
| 7 | 17.0 g $AgNO_3$ | 88.0 g | 131.5 g |
| 8 | 30.5 g $Bi(OH)_2NO_3$ | 126.2 g | 126.2 g |
| 9 | 15.1 g $SnO_2$ | 112.0 g | 112.0 g |
| 10 | 18.3 g $Cu(-NO3)_2 \cdot 3H_2O$ + 24.9 g $Pb(NO_3)_2$ | 188.0 g | 47.2 g |

Following the procedure outlined in Example 1, the following results are obtained:

| Example Number | Reaction Temperature | Acrolein Conversion | Acrylic Acid Yield on Initial Products |
|---|---|---|---|
| 5 | 262° C | 96.4% | 86.0% |
| 6 | 265° C | 97.0% | 85.9% |
| 7 | 262° C | 97.5% | 85.3% |
| 8 | 270° C | 96.4% | 83.4% |
| 9 | 258° C | 94.7% | 83.5% |
| 10 | 284° C | 94.5% | 83.5% |

EXAMPLES 11 – 13

The catalysts of Examples 11 – 13 are prepared using the procedure of Example 1. Besides the same quantity of antimony trioxide (87.5 g), ammonium monovanadate (35.1 g), ammonium paratungstate (30.4 g) and copper nitrate (24.2 g), the following are used:

| Example Number | Ammonium Heptamolybdate | Highly Dispersed $SiO_2$ | Diatomite |
|---|---|---|---|
| 11 | 247.0 g | 114.0 g | 114.0 g |
| 12 | 282.5 g | 123.5 g | 123.5 g |
| 13 | 177.0 g | 97.0 g | 97.0 g |

The catalysts have the following composition:

| Example | | | | | |
|---|---|---|---|---|---|
| 11 | $Sb_{3.14}$ | $Mo_{12}$ | $V_{2.57}$ | $W_{1.03}$ | $Cu_{0.85}$ |
| 12 | $Sb_{4.5}$ | $Mo_{12}$ | $V_{2.25}$ | $W_{0.9}$ | $Cu_{0.75}$ |
| 13 | $Sb_{7.5}$ | $Mo_{12}$ | $V_{3.6}$ | $W_{1.44}$ | $Cu_{1.2}$ |

The following optimum results are achieved using the reaction conditions of Example 1:

| Example Number | Temperature of the salt bath | Acrolein Conversion | Acrylic Acid Yield on Initial Quantity |
|---|---|---|---|
| 11 | 258° C | 96.0% | 84.5% |
| 12 | 265° C | 96.0% | 83.5% |
| 13 | 273° C | 93.7% | 77.6% |

EXAMPLE 14

The catalyst of Example 2 is heated after complete treatment for 2 hours in a nitrogen stream at 500°C. for the graduation of its activity.

Under standard test conditions, at a salt bath temperature of 282°C., a maximum acrolein conversion of 77.1% and an acrylic acid yield on initial quantities of 63% results.

EXAMPLE 15

A catalyst is prepared according to the procedure of Example 2, with the difference that 400 g ammonium nitrate are added to the aqueous solution.

Standard test conditions at 246°C. results in an acrolein conversion of 97.6% and a yield of 86.3% acrylic acid based on the initial quantities.

What is claimed is:

1. A process for the production of acrylic acid or methacrylic acid by oxidizing acrolein or methacrolein in the presence of water and oxygen in a vapor phase and in the presence of a catalyst, wherein said catalyst consists of (A) a mixture of oxides of the elements Sb, Mo, V and W, and (B) at least on oxide of the elements Pb, Ag, Cu, Sn, one or Bi, said catalyst having an atomic ratio of Sb : Mo : V : W : Group (B) elements of about 1 – 60 : 12 : 0.5 – 25 : 0.1 – 12 : 0.1 – 12, and further wherein oxidation is conducted at a pressure up to about 3 atmospheres and at a temperature of about 200° – 350°C.

2. Process of claim 1 in which the aldehyde is acrolein and the acid is acrylic acid.

3. Process of claim 1 in which the aldehyde is methacrolein and the acid is methacrylic acid.

4. Process according to claim 1 wherein the atomic ratio is about 3 – 40 : 12 : 1 – 12 : 0.1 – 6 : 0.1 – 6.

5. Process according to claim 1 wherein the atomic ratio is about 3 – 15 : 12 : 1 – 8 : 0.5 – 3 : 0.5 – 3.

6. Process according to claim 1 in which the catalyst contains at least one carrier.

7. Process according to claim 5 in which the catalyst contains at least one carrier having a specific surface area of about 0.5 – 30 m²/g and at least one carrier having a specific surface area of about 50 – 500 m²/g.

8. Process according to claim 7 wherein at least one carrier is a highly dispersed silicon dioxide or diatomite.

9. Process according to claim 8 wherein one carrier is montmorillonite.

10. Process according to claim 6 wherein one carrier is silicon dioxide mixed with montmorillonite which is heated to about 900° – 1200°C prior to mixing with the silicon dioxide.

11. Process according to claim 10 in which the montmorillonite is pretreated with hydrochloric acid, nitric acid, phosphoric acid or sulfuric acid.

12. Process according to claim 1 in which the oxygen is supplied by air.

13. Process according to claim 12 in which the aldehyde and air are in a molar ratio of 1 : 2.5 to 1 : 30.

14. Process according to claim 12 in which the aldehyde and water are in a molar ratio of 1 : 2 to 1 : 20.

15. Process according to claim 13 in which the aldehyde : air molar ratio is 1 : 2.5 to 1 : 10.

16. Process according to claim 14 in which the aldehyde : water molar ratio is 1 : 2 to 1 : 10.

* * * * *